(12) United States Patent
Fernandes et al.

(10) Patent No.: US 12,433,269 B2
(45) Date of Patent: Oct. 7, 2025

(54) GATE MECHANISM FOR A TRAWL NET

(71) Applicant: Fisheries Innovation & Sustainability, Perthshire (GB)

(72) Inventors: Paul G. Fernandes, Aberdeen (GB); Vivek Chacko, Aberdeen (GB); Richard David Neilson, Aberdeenshire (GB); Ahmed Elsayed Nassar, Leeds (GB)

(73) Assignee: Fisheries Innovation & Sustainability, Perthshire (GB)

( * ) Notice: Subject to any disclaimer, the term of this patent is extended or adjusted under 35 U.S.C. 154(b) by 0 days.

(21) Appl. No.: 18/036,076

(22) PCT Filed: Nov. 9, 2021

(86) PCT No.: PCT/GB2021/052897
§ 371 (c)(1),
(2) Date: May 9, 2023

(87) PCT Pub. No.: WO2022/096903
PCT Pub. Date: May 12, 2022

(65) Prior Publication Data
US 2023/0397584 A1    Dec. 14, 2023

(30) Foreign Application Priority Data
Nov. 9, 2020   (GB) .................................. 2017670

(51) Int. Cl.
A01K 73/02 (2006.01)
A01K 73/10 (2006.01)

(52) U.S. Cl.
CPC ............ A01K 73/063 (2022.02); A01K 73/10 (2013.01)

(58) Field of Classification Search
CPC .............................. A01K 73/063; A01K 73/10
See application file for complete search history.

(56) References Cited

U.S. PATENT DOCUMENTS

2013/0223693 A1* 8/2013 Chamberlain ......... A01K 73/10
                                                      382/110

FOREIGN PATENT DOCUMENTS

| CN | 111528185 | 8/2020 |
| CN | 111869633 | 11/2020 |
| CN | 113180018 A | 7/2021 |
| EP | 2777390 A1 | 9/2014 |
| WO | 2004020283 A2 | 3/2004 |
| WO | 2004020283 A3 | 3/2004 |

OTHER PUBLICATIONS

International Search Report and Written Opinion from EPO for PCT/GB221/052897 dated Feb. 17, 2022 (10 pages).
May 4, 2022 GB Search Report received from the United Kingdom International Property Office for GB Application No. GB2116105.4 (1 page).

* cited by examiner

*Primary Examiner* — Jessica B Wong
(74) *Attorney, Agent, or Firm* — Amundsen Davis LLC (57) ABSTRACT

A gate mechanism (20) is adapted for mounting within the extension (4) of a trawl net (1), the gate mechanism comprising a turbine (47/147/247) for powering rotation of the gate mechanism as it is dragged through the water within the trawl net.

20 Claims, 10 Drawing Sheets

GATE MECHANISM FOR A TRAWL NET

This invention relates to catch control of fish particularly for use in trawling operations. More specifically, the invention relates to a mechanism for selectively preventing fish from entering the cod end of a trawl net based upon selected criteria such as species or size for example to meet available quotas.

In trawl fishing operations, a net is dragged or pulled through the water behind a vessel. The net may be dragged through the water at a selected depth or alternatively dragged along the seabed, depending upon the specific species such as fish or shellfish that the trawl is seeking to catch. Where the intended catch spend much of their time freely swimming in the water, dragging the net through the water provides the best chance of landing the appropriate catch: this is known as pelagic or midwater trawling. Where the intended catch spend much of their time close to, on or within the sediment on the seabed, dragging the trawl net and its apparatus across the seabed has the desired result of disturbing the sediment, herding the fish into the path of the net and encouraging fish or other species to rise above the seabed where they can be swept into the trawl net: this is known as demersal or bottom trawling.

A typical trawl is substantially cone shaped, with an open end or mouth, which is connected to the vessel via long lines that allow the net to be positioned in the water behind the vessel at the required depth, and a narrow closed end extending away from the mouth of the net. As the net moves through the water, fish, shellfish or other species enter the open end of the net and are transported along the net towards a narrow closed end. This narrow closed end is known as the cod-end of the net.

Since the practice of trawling started, concerns have been raised over selectivity during trawling operations to try to avoid any undesirable fish or other species entering the net and being swept into the closed end of the net. In order to prevent over fishing of certain species, a vessel may have a maximum quota for a species that can be landed after a fishing trip. Under current landing obligations, all vessels are required to land all the catch of any such species that is subject to a quota. However, if unwanted species are caught or if the correct species of fish are caught but the fish are smaller than the optimum size required, skippers of vessels may in the past have resorted to discarding the unwanted species before landing in order to ensure that the landed catch can be maximised. Certain species, which are not subject to quotas and of no commercial value, may also be caught and thrown back overboard. The latter can be distinguished from discards, and are referred to as bycatch: they include some threatened, endangered and protected species such as sharks and rays. Discarding and bycatch has led to environmental and ecological losses of some species.

There has been a global effort focused on the reduction of bycatch and discards with a view to improving the sustainability of fisheries through the mitigation of economic, biological and ecological losses.

Some degree of selectivity for the size of fish is provided by controlling the mesh size of the net and particularly the mesh size of the cod end of the net. A fish entering the mouth of the net may still swim out of the open mouth. However, a fish that is funnelled into the cod end of the net is much less likely to find its way back along the net and out of the mouth of the net, particularly as the net is moving through the water behind the vessel. So typically, the mesh size of the cod end of the net is chosen to reflect the specific size or species of fish or shellfish that a trawl operation is hoping to catch.

However, selecting a mesh size for the cod end of the trawl net which allows undersized fish of one species to escape may also allow some legally catchable fish or shellfish of another species to escape. Therefore whilst controlling the mesh size of the cod end of the net can be helpful, it does not provide controllable selection, particularly during a trawl operation.

Other solutions have included tying ropes around the cod end to prevent the mesh from opening fully to try to limit the size of the fish that can swim out of the cod end. A problem that has been found with this method is that whilst the mesh cannot open fully, it may be pulled into a diamond or square shape which can facilitate fish of a larger size than intended being able to swim free from the cod end of the net.

Consideration has been given to real time imaging of fish entering the trawl net and selective control of the opening or closing of the cod end of a trawl net in order to assist in ensuring that unwanted species are able to be removed safely from the trawl net without harm before the net is recovered to the vessel. This would reduce the instances of landing unwanted species. However commercially successful solutions have not yet been found.

The present invention aims to provide selectivity of a catch to a trawl net, with optional real time feedback to the vessel in order to mitigate or at least alleviate the above problems associated with known trawl nets.

The present invention aims to provide a gate mechanism that is adapted to be mounted within the extension portion of a trawl net, between the mouth and the cod end, in order to assist in selection of fish to be caught and landed in the trawl net and to provide a means for releasing unwanted fish species from the net before they enter the cod end of the net.

According to one aspect of the present invention there is provided a gate mechanism adapted for mounting within the extension of a trawl net, the gate mechanism comprising a turbine for powering rotation of the gate mechanism as it is dragged through the water within the trawl net.

Preferably the gate mechanism comprises a housing and a barrier mounted within the housing, the barrier having open and closed sections.

Preferably also the gate mechanism further comprises a rotatable door mounted within the housing, the door having open and closed sections which can selectively overlie the open and closed sections of the barrier.

In one embodiment, the barrier is substantially conical in form and the door is similarly conical in form.

In alternative embodiments, the barrier and door may have a curved or convex form.

Preferably the gate mechanism further comprises a latch for arresting rotation of the door in selected positions to selectively provide a passageway through the gate mechanism into the cod end of the trawl net.

In a first selected position, the door may be locked when the open sections of the door overlie the open sections of the barrier and the closed sections of the door overlie the closed sections of the barrier.

In a second selected position, the door may be locked when the closed sections of the door overlie the open sections of the barrier and the open sections of the door overlie the closed sections of the barrier.

The first and second selected positions may be considered as catch or release positions.

Advantageously the housing of the gate mechanism comprises a cylindrical frame.

Advantageously the barrier is comprised of a plurality of segments. Conveniently, the plurality of barrier segments are triangular.

Conveniently, the door is also comprised of a plurality of segments. Conveniently, the plurality of door segments are triangular.

Advantageously the number of segments in the barrier equals the number of segments of the door.

Conveniently, the size of the segments is substantially the same as the size of the segments of the door.

Conveniently, a pair of opposed triangular segments of the barrier have a closed configuration and a pair of opposed triangular segments have an open configuration.

Conveniently, also a pair of opposed triangular segments of the door have a closed configuration and a pair of opposed triangular segments of the door have an open configuration.

Advantageously a mesh or net covers the triangular segments of the barrier and the door with a closed configuration.

Alternatively the triangular segments of the barrier and the door with a closed configuration may be covered by a honeycomb material.

Alternatively, the triangular segments of the barrier and the door with a closed configuration are formed of solid panels of material.

Alternatively or additionally, the material covering the triangular segments may be impervious.

Preferably, the door further comprises a substantially annular rim.

Advantageously, the rim is provided around the base of the triangular segments of the door.

Conveniently, the turbine comprises a plurality of blades provided around the rim of the door.

Alternatively, the turbine comprises one or more flutes or blades provided on at least one of the closed door segments.

Conveniently, the flutes or blades may be provided on each of the closed door segments.

Advantageously the flutes or blades extend outwardly from the surface of the closed segments of the door to provide a surface against which the hydrodynamic forces act to produce torque to rotate the door.

In some embodiments the flutes or blades may be spirally mounted on the closed segment or segments of the door.

Advantageously, the leading and trailing edges of the flutes or blades may be shaped to prevent damage to any animal or marine life and provide a surface against which the hydrodynamic forces act to produce torque to rotate the door.

Conveniently, the leading edge of the flutes or blades may be convex in form. Preferably also the trailing edge of the flutes or blades may be concave in form.

Advantageously, the door further comprises a plurality of arcuate panels extending from the rim and surrounding the triangular segments of the door.

Conveniently, the arcuate panels extend around the open segments of the door.

Preferably, the arcuate panels extend from the rim to a position beyond the apex of the triangular segments of the door.

Preferably, the housing of the gate mechanism comprises a substantially cylindrical structure with open circular ends held apart by a plurality of elongate rods or bars.

Conveniently, the door is rotatably mounted within the housing on bearings.

According to a further aspect of the present invention there is provided a system for controlling selection of fish species caught during trawling operations comprising a trawl net including a gate mechanism according to the first aspect of the invention mounted within the extension of the trawl net.

Conveniently the system further comprises one or more openings in the extension of the trawl net which selectively overlie or correspond to the position of the arcuate panels of the gate mechanism when it is mounted in the extension.

Conveniently also, the system further comprises a detection device mounted on or within the trawl net in advance of the gate mechanism for capturing data on fish size and/or species passing through the gate mechanism.

Preferably said detection device comprises a stereo camera.

Advantageously, the system further comprises a processor connected to the camera and the gate for processing signals received from the camera and controlling operation of the gate in response to said received signals to move the gate between an open position in which fish entering the gate mechanism are released from the opening in the extension and a closed position in which the opening in the extension is covered by the gate mechanism and fish are directed through the gate mechanism into the cod end of the trawl net.

Preferably, image-displaying equipment may be mounted on a vessel to view images, or data, captured and processed by the camera.

Preferably also control means for the processor are provided on the vessel to allow an operator to selectively operate the gate mechanism in response to signals generated by fish passing the camera.

Embodiments of the present invention will now be described with reference to the accompanying drawings in which:

FIG. 13b is a plan view of the door mechanism of FIG. 13a;

FIGS. 13c-f are segmented views through the door mechanism of FIG. 13a;

FIG. 14b is a plan view of the door mechanism of FIG. 14a, and

FIGS. 14c-f are segmented views through the door mechanism of FIG. 14a.

Figure 1:
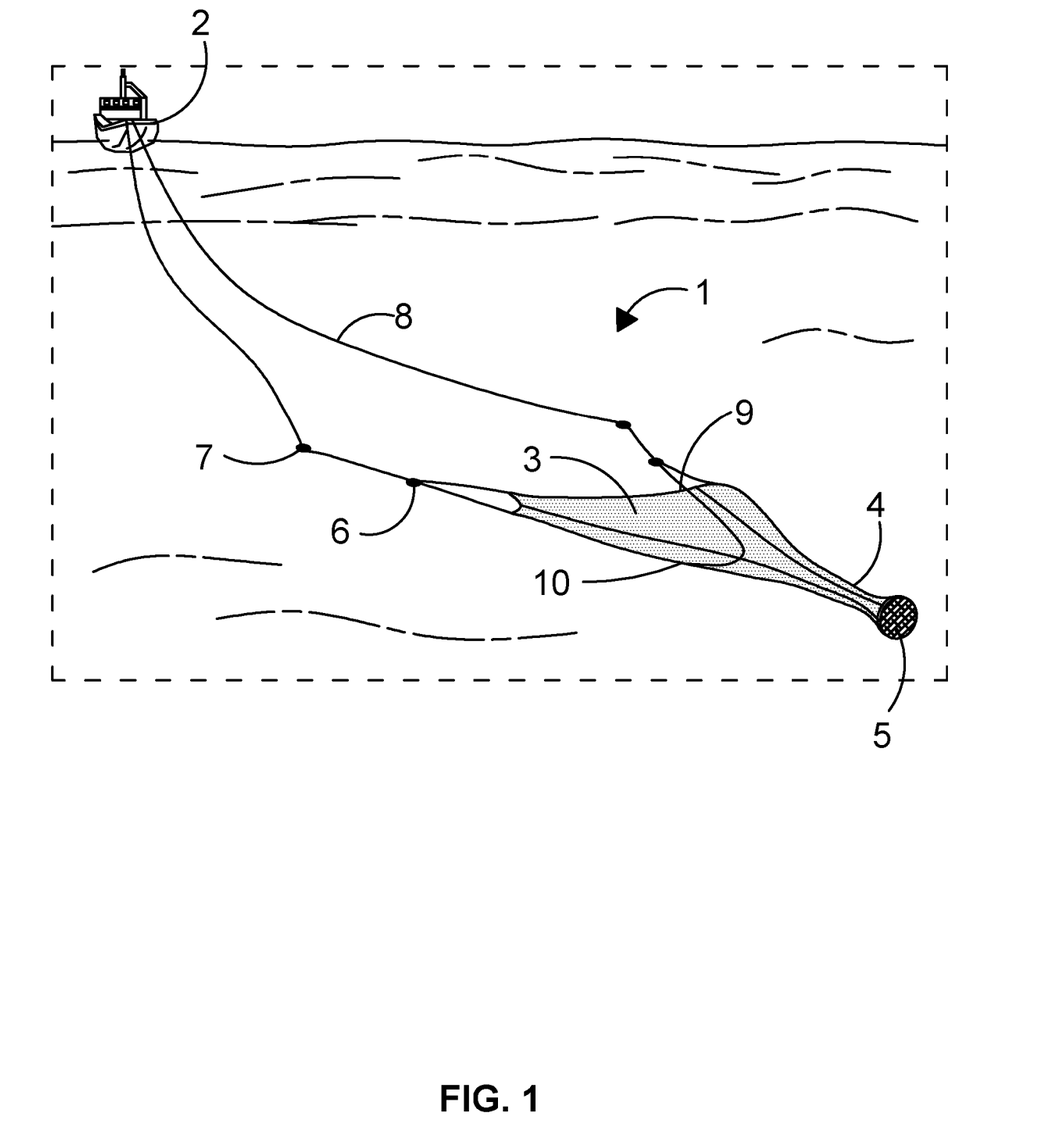
FIG. 1 is a schematic drawing showing a known trawl net pulled behind a fishing vessel.

FIG. 1 shows a known demersal or bottom trawl 1 net being towed through the water behind a fishing vessel 2. The trawl net as described above has a near conical form and has a wide, open end or mouth 3, a tapering section extending back from the mouth known as an extension 4 and a narrow closed cod end 5 within which the catch is trapped. The open mouth 3 of the trawl net may be circular or square and is held open by lines 6 at either side of the mouth called sweep lines. In the net shown in FIG. 1, the sweep lines have planar elements 7 known as doors mounted to the end of the sweep lines 6 remote from the net. These doors may be around 1 m square or larger in size and drag along the seabed to produce a sediment cloud between the doors and the open mouth of the net. Towing lines 8 extend from the doors to the vessel to allow the net to be towed behind a vessel as shown in FIG. 1.

The top edge of the mouth of the trawl net is known as the head line 9 and the bottom edge of the mouth of the trawl net is the footrope or fishing line 10. In a typical trawl net, the length of the net between the head line 9 and the cod end 5 is greater than the length of the net between the footrope 10 and the cod end 5.

As described above, behind the mouth 3, the net tapers inwards to a generally cylindrical portion known as the extension section 4 and the trawl net terminates in a closed cod end 5. The mesh size of each of the components making up the trawl net may be different in order to assist in selectivity of the fish species intended to be caught in the net. Typically, the mesh size of the net at the cod end is less than the mesh size of the rest of the net. Additionally or alternatively, the shape of the mesh panels may be different between different components of the net.

Figure 2:
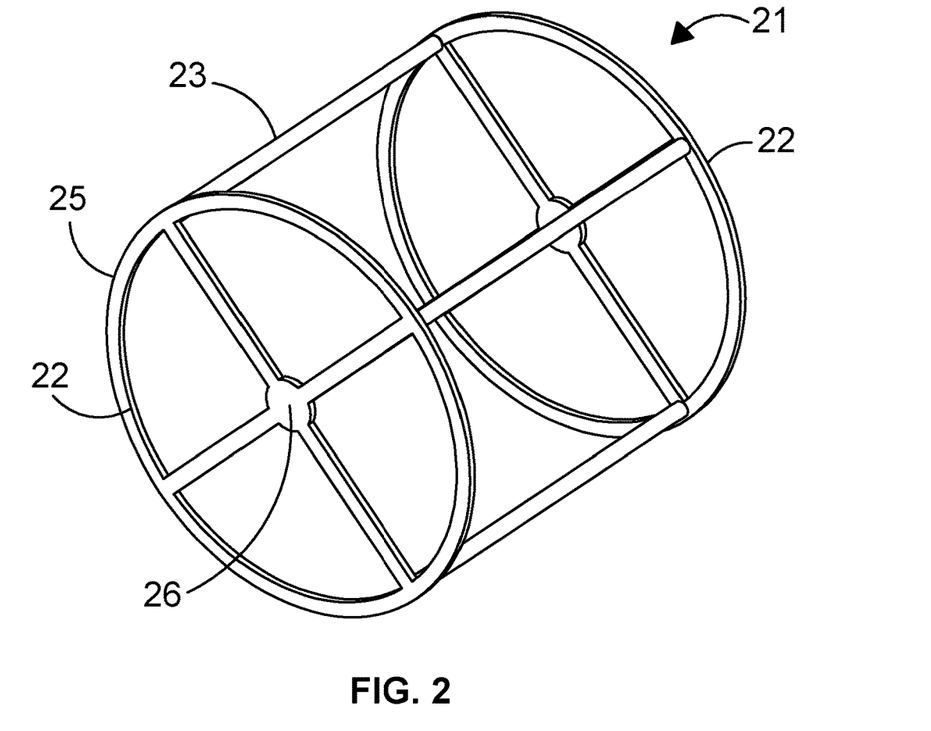
FIG. 2 is a schematic view of a frame of a hydrodynamic gate according to an embodiment of the present invention.

A gate mechanism 20 according to one embodiment of the present invention is illustrated in FIG. 2. The gate mechanism is adapted to be mounted within the extension portion 4 of a trawl net as illustrated in FIG. 1 between the wide, open mouth 3 at the leading end adjacent to the vessel towing the net when the net is in the water and the closed cod end 5 at the trailing end of the net.

The gate mechanism 20 comprises a hollow cylindrical housing or frame 21 comprised of two open, flat circular ends 22 held a fixed distance apart by a plurality of elongate members such as rods or spars 23, which extend between the two open, flat circular ends. In the embodiment shown, four spars or are provided equispaced around the circumference of the circular flat ends, although the number of spars may be increased or decreased if required.

Each circular flat end 22 has four equispaced, radial ribs 24 that extend from the circumference 25 of the circular flat end towards the centre of the circular flat end at which they meet in a central boss 26. These ribs provide structural stability to the ends of the frame 22 and ensure the frame retains its cylindrical form within the extension of the net. In other embodiments, the number of radial ribs may be increased or decreased.

Figure 3:
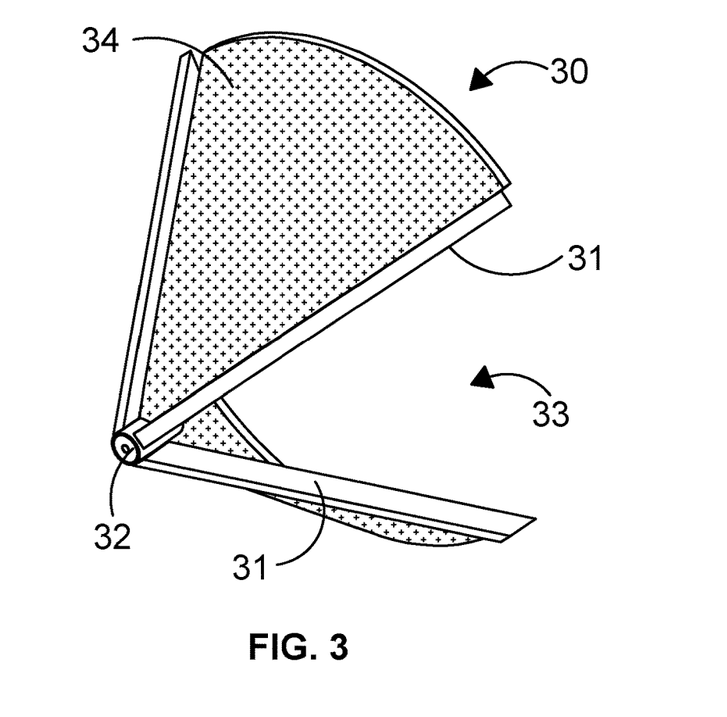
FIG. 3 is a schematic view of a barrier of the frame of FIG. 2.

In the illustrated embodiment, a conical barrier 30 is mounted within one end of the frame 21. In FIG. 3 the barrier is shown out with the frame for clarity. The barrier 30 comprises four equally sized triangular segments 31 connected together at the apex 32. Two opposing triangular segments 33 are open and the other two opposing triangular segments 34 are closed or covered. The covered segments may have a mesh or net stretched between the sides of the segments. Alternatively, the covered segments may be formed of a solid material such as anodised aluminium or stainless steel or a composite material.

Figure 4:
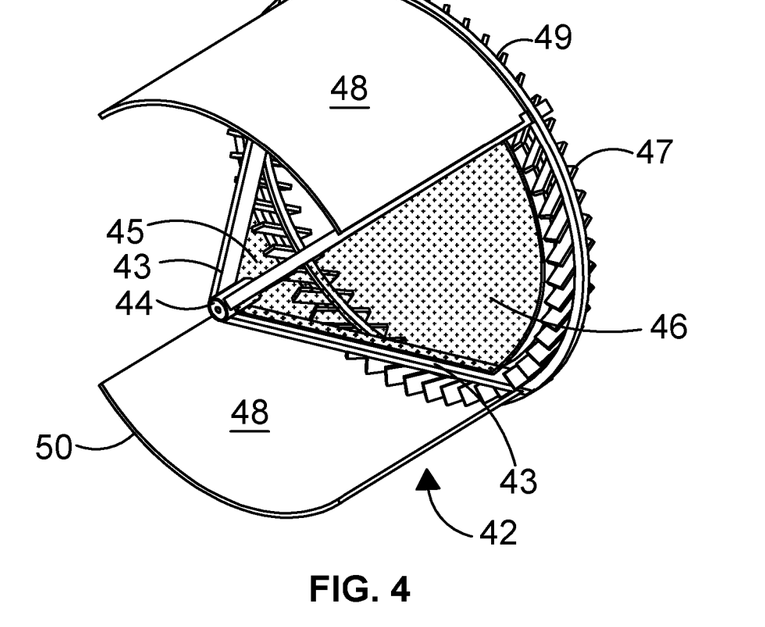
FIG. 4 is a schematic view of a door of the gate.
Figure 5:
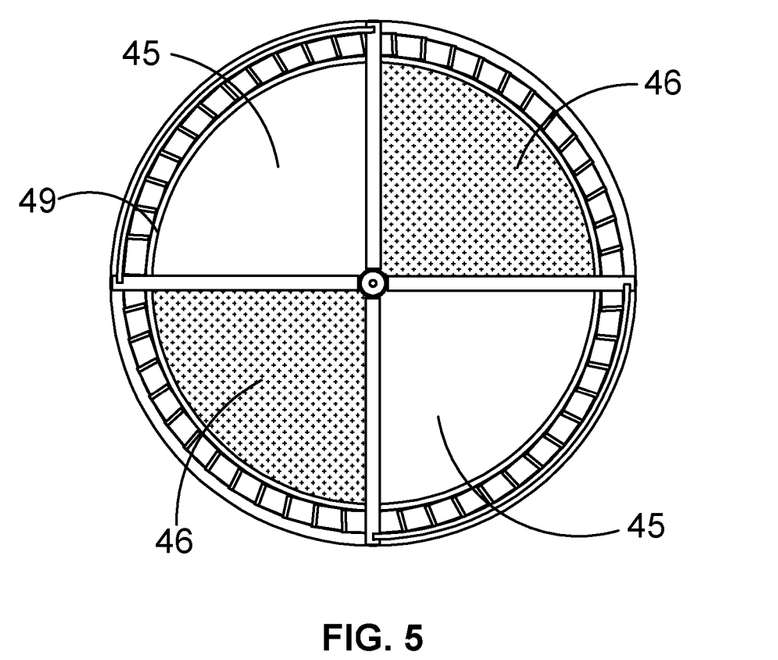
FIG. 5 is a front view of the door of FIG. 4.
Figure 6:
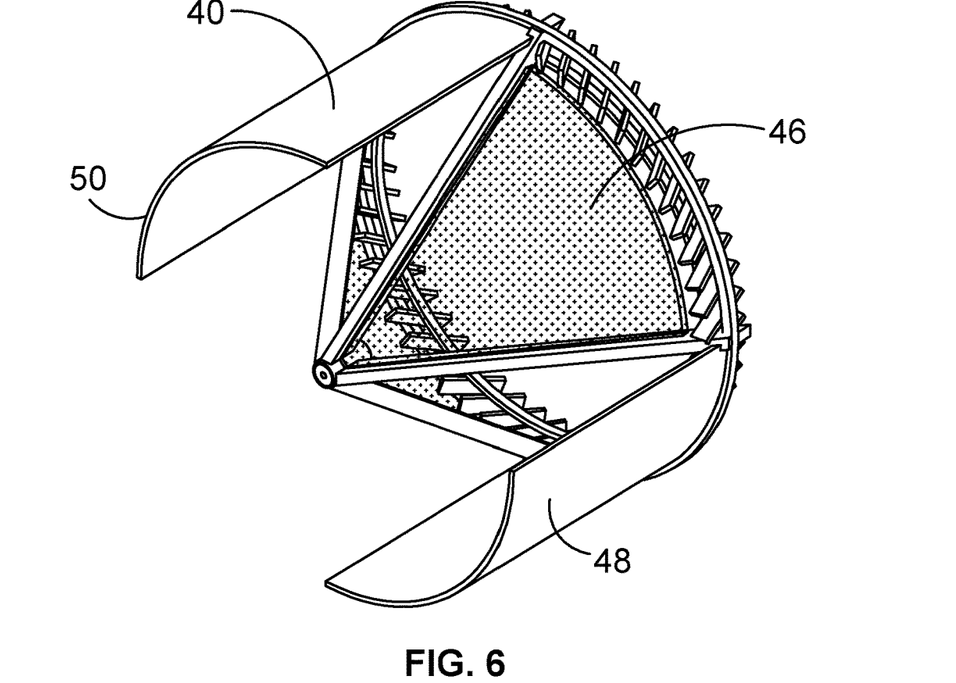
FIG. 6 is a first isometric view of the door of FIG. 4 in which the closed segments of the door are covered by a mesh.
Figure 7:
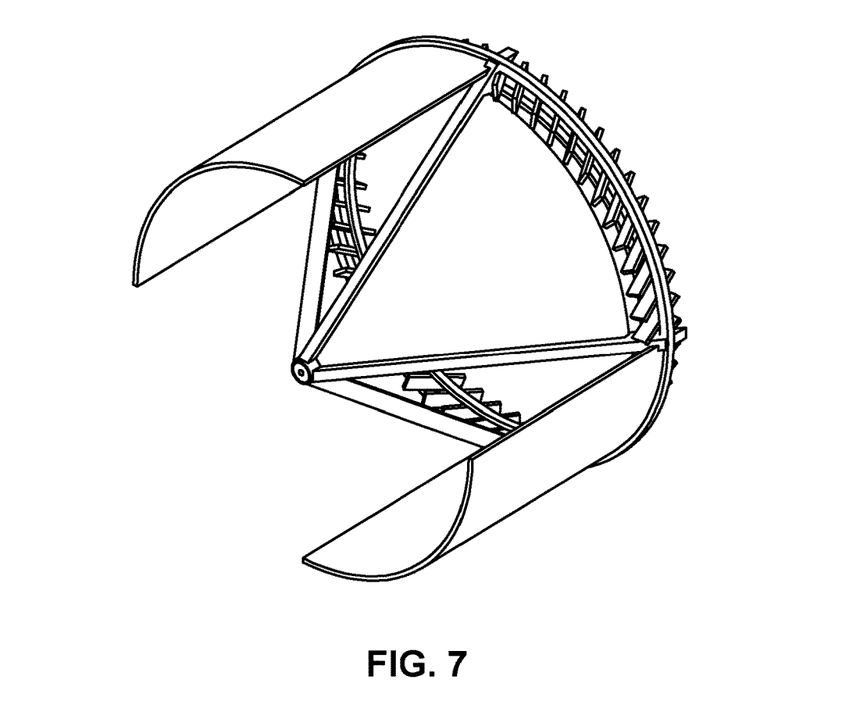
FIG. 7 is an isometric view of the door of FIG. 4 in which the closed segments of the door are covered by a solid panel.

A door 40 is rotatably mounted within the cylindrical frame 21 over the conical barrier 30. The door is shown in FIG. 4 and comprises a circular rim 41 which has a diameter slightly smaller than the diameter of the cylindrical frame 21 to allow the rim of the door to be mounted within the frame parallel to and between the two circular flat ends 22 of the frame whilst allowing the rim to rotate within the frame.

The door 40 also comprises a conical element 42 that extends from one side of the rim. In the illustrated embodiment in FIG. 4, the conical element 42 comprises four triangular segments 43 mounted around the rim. Each segment extends around 90 degrees of the rim. The segments come together at the apex 44 of the conical element. Similarly to the barrier 30, two opposing triangular segments 45 of the conical element 42 have an open form and the other two opposing triangular segments 46 have a closed form. The closed segments 46 may for example have a mesh or net stretched between the sides of the triangular segments to prevent any fish species passing through the segment. Alternatively, the closed segments may be formed of a solid material such as anodised aluminium or stainless steel or a composite material.

As the door 40 is adapted to be rotatably mounted within the frame 21 over the conical barrier 30, the opposed open segments of the door 45 can be selectively aligned with the open segments 33 or closed segments 34 of the barrier to provide a pathway for fish species through the frame 21 or alternatively block passage of fish species through the frame.

The frame 21 and door 40 are each preferably constructed from corrosion resistant material such as stainless steel, anodised aluminium alloy or a fibre reinforced composite for example.

It is envisaged that in alternative embodiments, the barrier 30 and door 40 may be formed with different geometry and different numbers of open and closed sections. The illustrated embodiment has a conical barrier and conical door. In other (non-illustrated) embodiments, the barrier and door may for example be convex in shape or may be part spherical. Whilst the door 40 has four sections in the embodiment illustrated in FIG. 2, different numbers of door segments may be provided. For example, two door segments may be provided, one open in form, the other closed, with each door segment extending 180 degrees around the rim of the door. Alternatively six segments may be provided, three open and 3 closed, each segment extending 60 degrees around the rim. In a further alternative embodiment, eight door segments are provided, four open and 4 closed, with each segment extending 45 degrees around the rim of the door. It is envisaged that the number of open and closed segments of the door 40 will match the number of open and closed segments of the barrier 30.

The door of the gate mechanism comprises a turbine which facilitates rotation of the door as the gate mechanism is towed through the water within a trawl net as will be described further below. The turbine in the illustrated embodiment comprises a plurality of blades 47 provided around the circular rim 41 of the door as shown in FIG. 4.

The turbine blades are provided internally around the rim 41 and extend on each side of the rim. The blades are angled around the rim to ensure that when the door is positioned within the cylindrical frame 21 and the device is towed through the water during a trawling operation, flow of water past the fins generates a hydrodynamic force, which generates a torque to rotate the door 40 within the cylindrical frame 21.

In the embodiment shown, two arcuate cowling plates 48 are mounted on the rim 41 of the door. The cowling plates are mounted around the base 49 of the open segments 45 of the door. In alternative embodiments with different numbers of open segments 45, the number of cowling plates 48 will match the number of open segments. In the embodiment of FIG. 4, each cowling plate 48 extends substantially 90 degrees around the rim of the door. The length of the cowling plates may be substantially similar to the distance from the rim 41 to the apex 44 of the door segments. In alternative embodiments, the length of the cowling plates may be longer than the illustrated embodiment.

The cowling plates 48 may have the same radius of curvature as the rim so the free ends of the cowling plates 50, remote from the rim, may form part of a circle having the same diameter as the rim of the door. The arcuate cowling plates are formed of a material similar to that of the door itself but need not be formed of the same material.

The door is supported on bearings b (shown in FIG. 100 that are mounted in the radial supports attached to the outer frame A latch 60 is provided on the frame 21 of the gate mechanism to arrest the rotation of the door and hold the door at selected positions within the frame. The latch is illustrated in FIGS. 10a-d.

In the illustrated embodiment, the latch comprises a housing 61 mounted on one of the spars 23 of the frame. The housing has a throughbore that enables the housing to slide onto the spar as shown in FIGS. 10c1 and 10c2. The housing is mounted on the spar towards one end of the spar such that the housing sits adjacent to the rim of the door when the door is mounted in the frame.

The housing has a recess 62 within which a pin 63 is retractably mounted. A spring may be provided within the recess behind the pin such that the pin is biased into a position in which it extends from the recess but can be retracted into the recess against the bias of the spring. Thus, preferably the default position of the pin is extended from the recess.

Alternatively in a non-illustrated embodiment, the spring may be replaced by a two way solenoid to provide the movement of the pin into and out of the recess.

The side edge of the rim of the door is provided with notches 64 at selected positions around the rim. In the embodiment illustrated, four equispaced notches are provided equispaced around the rim although in different embodiments the number of notches will match the number of segments of the barrier and door.

The latch housing is mounted on the frame such that when the pin 63 of the latch is extended it can locate in one of the notches 64 on the rim. In this position, the door will be held within the frame and prevented from rotating further past the pin.

In alternative embodiments, the latch may be mounted in an alternative position on the frame 21.

Figure 10A:
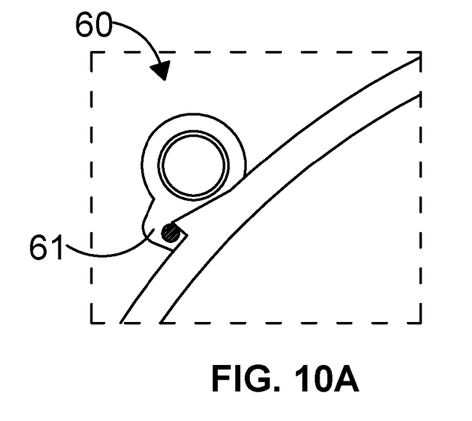
FIGS. 10*a-e* illustrate the stages of operation of a latch to hold the door of the gate mechanism in selected positions.
Figure 10B:
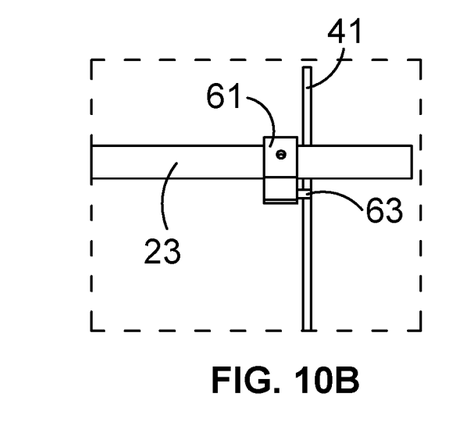
Figure 10C:
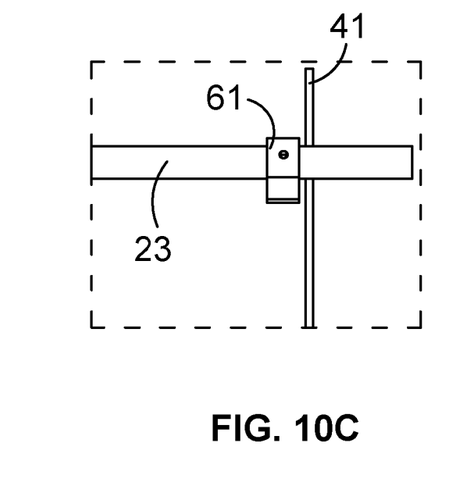
Figure 10D:
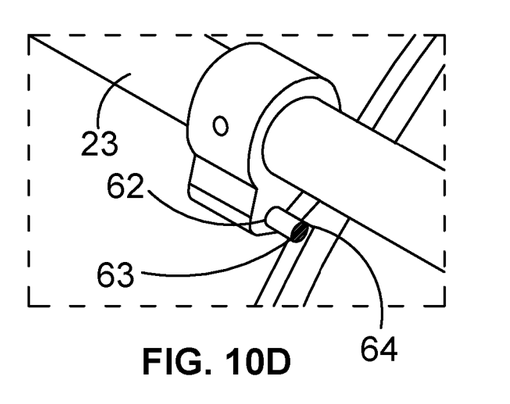
Figure 10E:
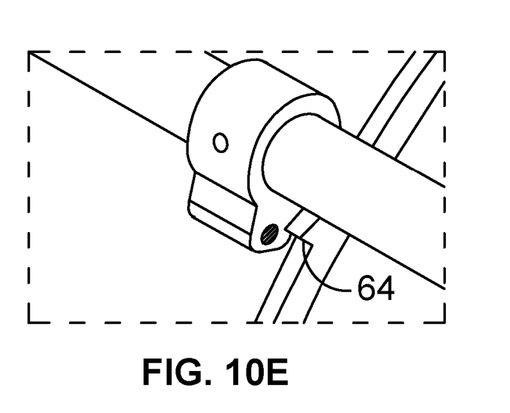
Figure 10F:
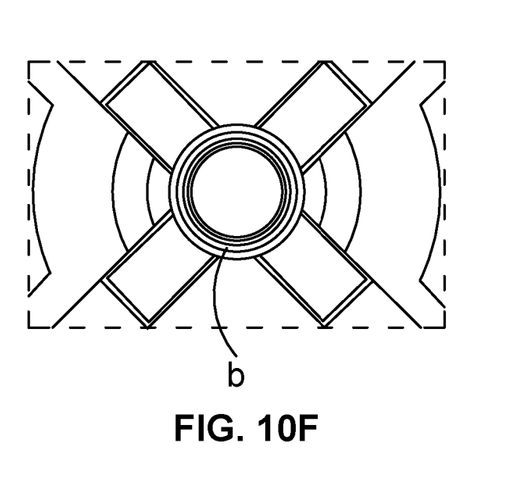
FIG. 10*f* is a schematic view of bearings for mounting the door in the radial supports attached to the outer frame.

FIG. 10a shows a front view of the latch with the pin engaged with one of the notches on the rim. FIGS. 10b and 10c show side and perspective views of the same position. FIG. 10d shows a side view of the latch with the pin retracted within the recess. In this position, the door is free to rotate under the influence of the torque induced by the fluid flow. By spring loading the pin, and selectively retracting the pin into the recess, when the pin is released, the pin will return to the default extended position and the flow will rotate the door to the next position where the pin engages in a notch to stop the door in that position.

A solenoid may be mounted on the housing of the latch to control retraction of the pin into the recess.

Figure 8:
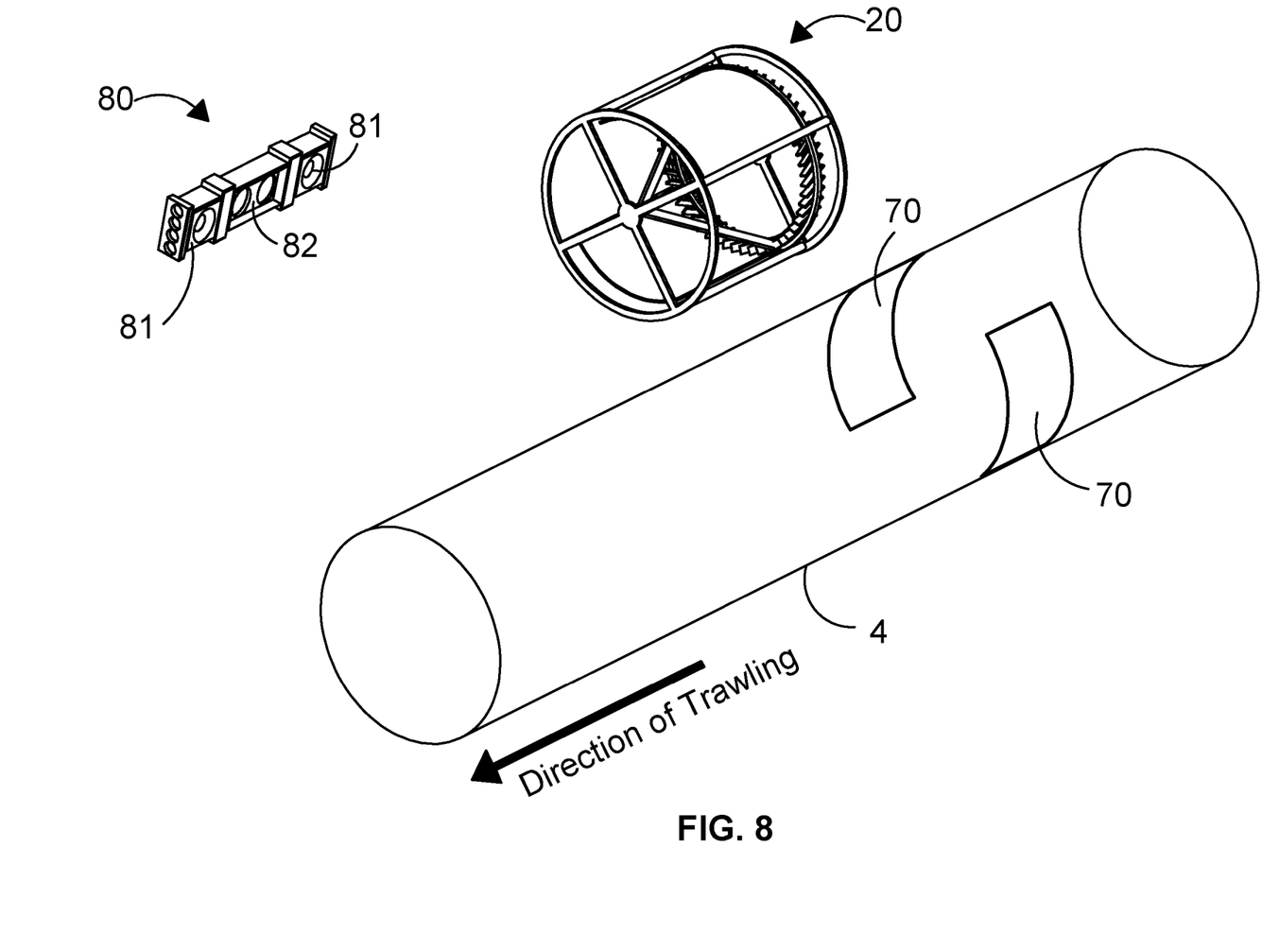
FIG. 8 is an exploded view of the assembled gate mechanism of the present invention and an extension portion of a trawl net.

The gate mechanism 20 is adapted to be mounted within the extension 4 of the trawl net as mentioned above. FIG. 8 shows a schematic view of an extension portion 4 of a trawl net extending between the trawl mouth 3 and the cod end 5 as illustrated by the internal arrow. The external arrow illustrates the direction of movement of the net through the water behind the vessel.

The extension of the trawl net has two opposing rectangular openings 70 which are located on opposite sides of the extension 4 towards one end of the extension in a region closer to the cod end 5 of the trawl net than the mouth.

The gate mechanism 20 is adapted to sit within the extension of the trawl net such that the openings 70 in the extension are aligned with the open segments of the gate mechanism. Fixing means may be provided to mount the gate mechanism in the correct position within the extension.

It is anticipated that the gate mechanism of the present invention will be operated in conjunction with imaging and processing equipment to capture images of fish species traveling through the extension of the trawl net. This will assist an operator on a vessel to selectively set the gate mechanism to the open or closed position depending upon whether the fish species travelling through the extension meet the desired size or species requirements for the trawl.

According to one embodiment of the present invention shown in FIG. 8, the imaging and processing equipment includes a stereo camera system 80 comprising two digital cameras 81 which are synchronised with each other and a strobe flash 82 mounted in the extension in front of the gate mechanism (as the trawl net moves through the water).

The camera system is connected to image processing equipment (not shown) mounted within the trawl net or carried on the vessel. Images from the camera system may be transferred to the image processing equipment through any known means as will be understood by the skilled person.

The distance between the stereo camera system 80 and the gate mechanism 20 is decided by several factors that include the speed of trawling, type of fisheries and the latency of the bycatch reduction mechanism. Factors which contribute towards latency include the delay between image capture and processing, delay of any control system and the time for the gate to move between catch and release positions. For example, assuming that there is a latency of 1 second for image processing, the stereo camera should be at least 1.8 m ahead of the gate for a trawl speed of 3.5 knots to permit the gate mechanism to selectively open to release the fish passing the camera system.

The camera system is preferably mounted within a frame 83 to provide protection to the electronic components of the camera system both from seawater but also from fish and other species moving past the camera system. The frame also allows buoyancy to be carried to offset the weight of the camera system.

Figure 9:
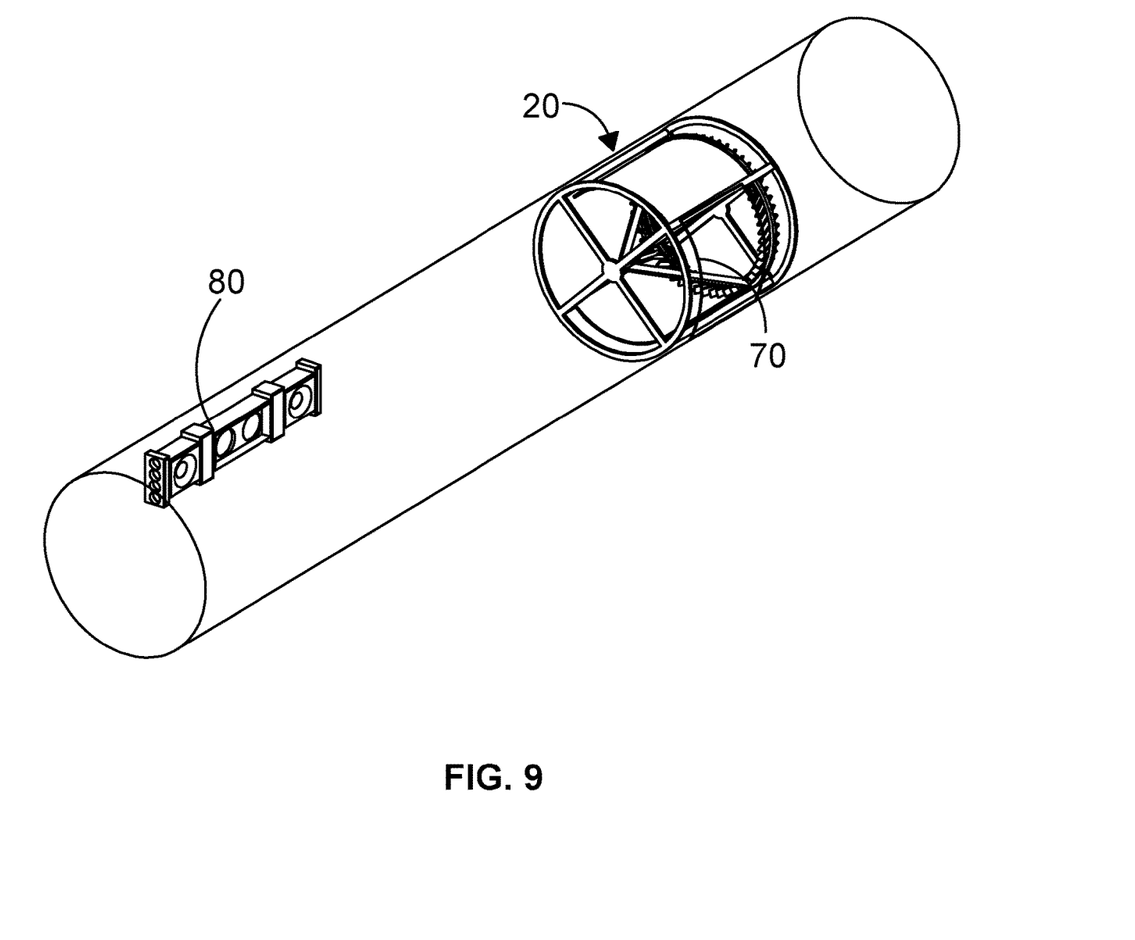
FIG. 9 is a schematic view of the gate mechanism of FIG. 6 within the extension portion of the trawl net.

FIG. 9 illustrates the gate mechanism 20 according to the present invention mounted within the extension 4 of the trawl net with the gate mechanism aligned with the openings 70 in the sides of the extension and the stereo camera system mounted within the extension in advance of the gate mechanism.

Figures 11A, 11B, 11C:
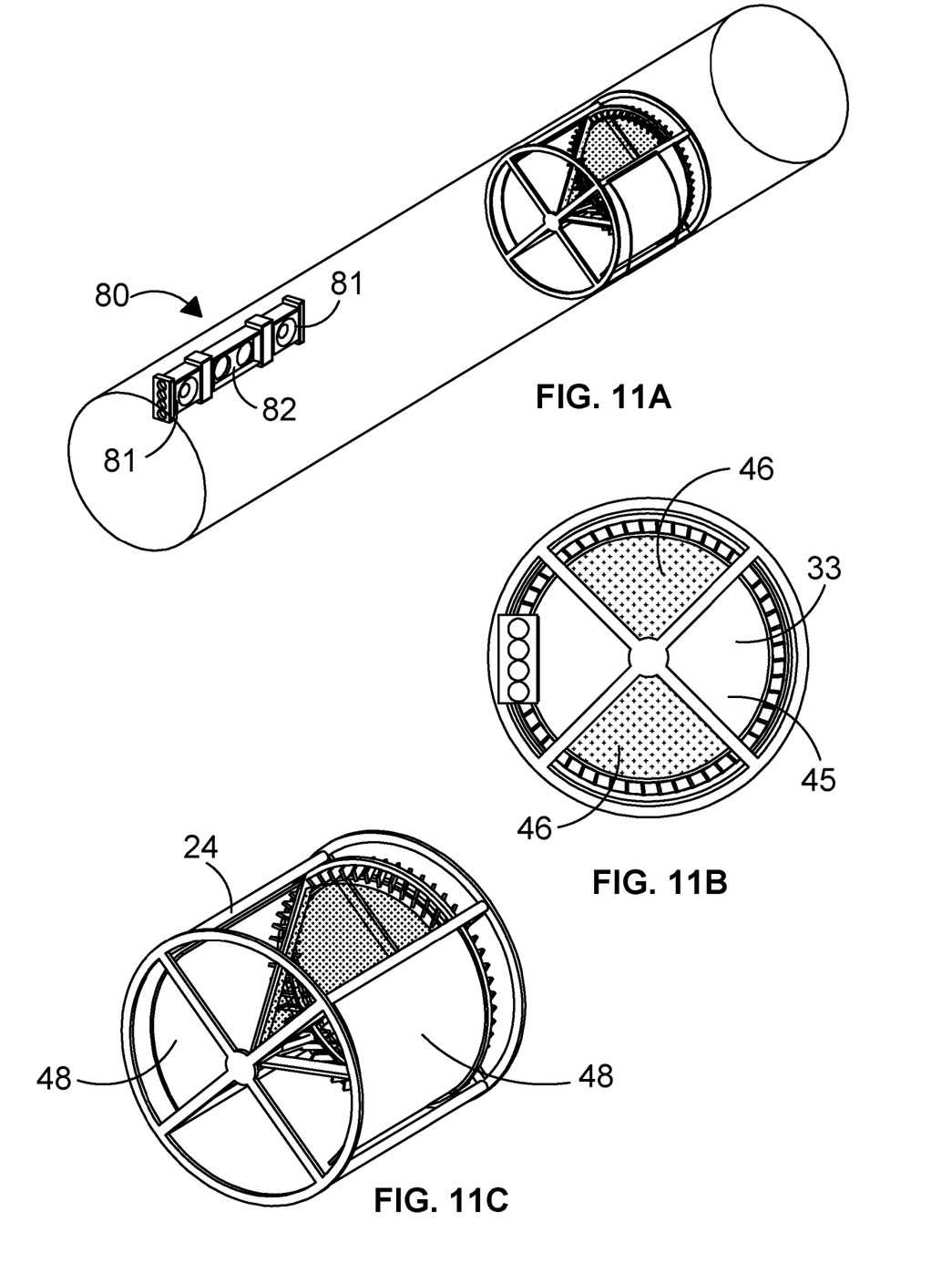
FIG. 11*a* is a schematic view of the gate mechanism according to an embodiment of the present invention in a catch or open position in a trawl net.
FIG. 11*b* is a front view of the gate mechanism of FIG. 11*a*.
FIG. 11*c* is a perspective view of the gate mechanism of FIG. 11*a*.

FIGS. 11a-c illustrate the gate mechanism 20 in a closed or "catch" position within the extension of the trawl net. In this position, as fish are directed along the extension of the trawl net towards the gate mechanism, the door 40 is held by the latch such that the open triangular door segments 45 are aligned with the open segments 33 of the barrier. FIG. 11b shows a front view of the gate mechanism within the extension with the open segments of the door 40 and the barrier 30 aligned to provide a passage through the gate mechanism. In this position, the cowling plates 48 of the door 40 close off the openings 70 in the extension of the trawl net, thus fish entering the gate mechanism 20 can be swept through the open door segments 45 and past the circular rim 41 of the gate mechanism into the cod end 5 of the trawl net without being able to escape the net through the openings 70 in the extension. FIG. 11c shows the detail of the gate mechanism in this position.

Figures 12A, 12B, 12C:
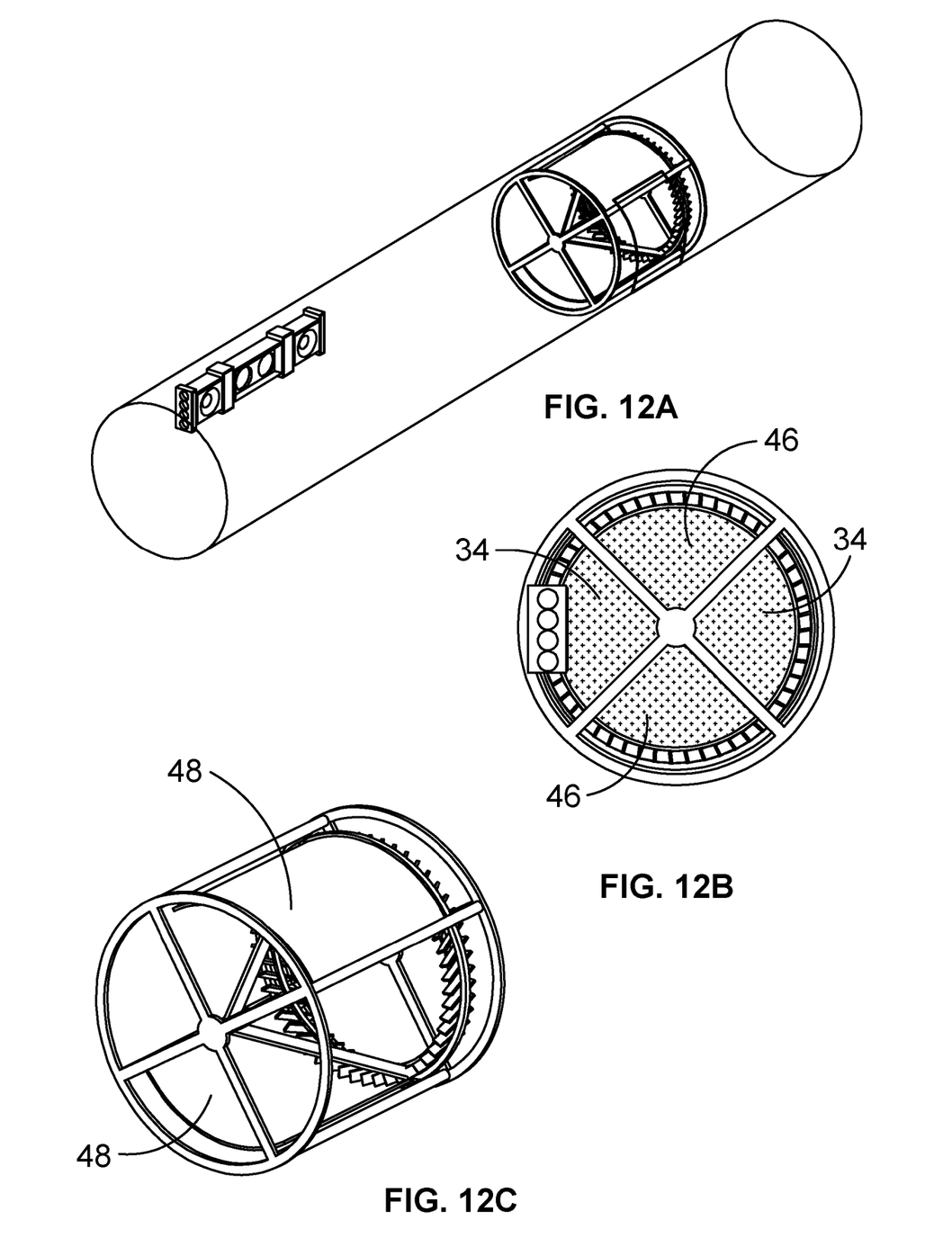
FIG. 12*a* is a schematic view of the gate mechanism according to an embodiment of the present invention in a release or closed position in a trawl net.
FIG. 12*b* is a front view of the gate mechanism of FIG. 12*a*.
FIG. 12*c* is a perspective view of the gate mechanism of FIG. 12*a*.

FIG. 12 illustrates the gate mechanism 20 in an open or "release" position within the extension of the trawl net. In this position, as fish are directed along the extension of the trawl net towards the cod end, the door is held by the latch such that the closed triangular door segments 46 are rotated to sit on top of and close off the open segments 33 of the barrier. FIG. 12b shows a front view of the gate mechanism 20 within the extension with the closed segments of the door 46 rotated to sit over the open segments of the barrier and thus passage through the gate mechanism 20 to the cod end of the trawl net is blocked. FIG. 12c shows the detail of the gate mechanism in this position.

With the door 40 of the gate mechanism 20 rotated in this position, the cowling plates 48 of the door are rotated away from the opposed openings 70 in the extension and so fish passing through the extension 4 and into the gate mechanism 20 cannot enter the cod end of the trawl net but are directed through the opposed openings 70 in the side of the extension and out of the net into the water towards the rear of the trawl net or cod end.

Whilst embodiments of the present invention are described above in which the turbine comprises a plurality of blades provided around the circular rim of the door, in alternative embodiments, the blades of the turbine may be replaced by at least one blade or flute on at least one of the closed segments of the door. Blades or flutes may be spirally formed on the closed segment of the door or may be attached to the door to provide surfaces against which the hydrodynamic forces act to produce torque to turn the door.

FIGS. 13 a-f illustrates a modified door of a further embodiment of the present invention. In this embodiment like elements are numbered similarly to the earlier embodiments but increased by 100. FIG. 13a shows the door 140 in side view and FIG. 13b shows the door in plan view. FIGS. 13b-f illustrate sections through the door at different points along the door from the rim 141 to the apex 144. The door 140 has similar open and closed segments 145, 146 of the earlier embodiments, however in this embodiment, a blade or flute 147 is provided on the outer surface of each of the closed segments 146.

Figure 13A:
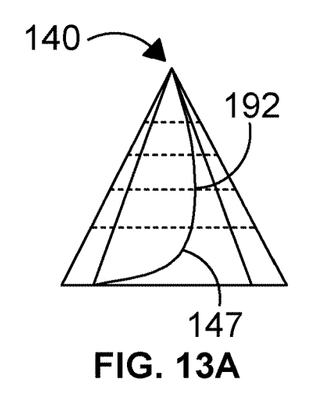
FIG. 13*a* is a side view of an alternative door mechanism of a further embodiment of the present invention.
Figure 13B:
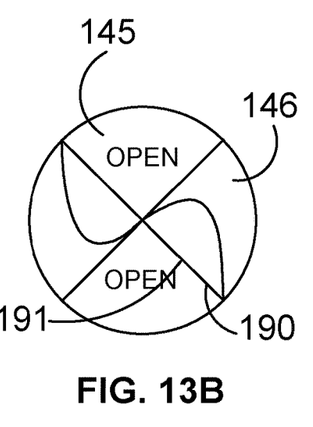
Figure 13C:
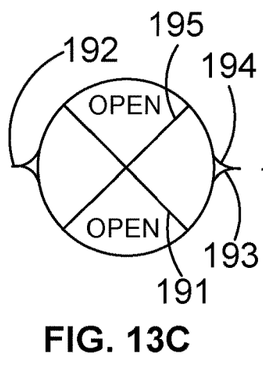
Figure 13D:
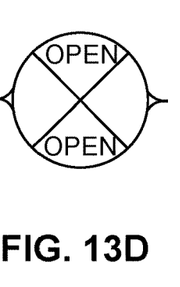
Figures 13E, 13F:
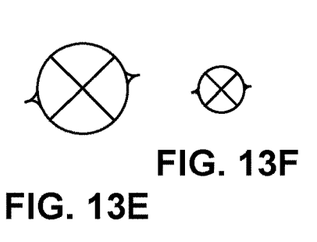

The blade or flute 147 has a substantially straight inner edge 190 proximate the leading edge 191 of the closed segment of the door and a curved outer edge 192. The blade or flute extends outwardly from the surface of the closed segment of the door and the outer edge curves from the apex 144 of the door to the rim 141.

The front surface 193 of the blade or flute, between the curved outer edge 192 and the straight inner edge 190 curves inwards towards the surface of the closed segment of the door as it extends from the curved outer edge 192 towards the straight inner edge 190. The back surface 194 of the blade or flute, between the curved outer edge 192 and the trailing edge 195 of the closed segment of the door, also curves inwards towards the surface of the closed segment of the door to provide a smooth transition between the back surface 194 of the blade or flute and the surface of the closed segment of the door. This is best viewed in FIGS. 13c-f showing the inward curvature of both front surface 193 and back surface 194 of the blade or flute towards each of the leading and trailing edges of the closed segment of the door.

In the illustrated embodiment a blade or flute is provided on each of the opposing closed segments of the door. The blades or flutes may be formed of the same material as the rim of the door and fixed to the surface of the door, for example by welding the blades or flutes in position.

A further embodiment similar to that of FIGS. 13a-f is illustrated in FIGS. 14a-f. In this embodiment, like elements are numbered similarly to the earlier embodiments but increased by 200.

Figure 14A:
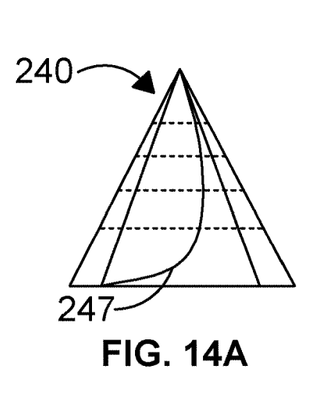
FIG. 14a is a side view of an alternative door mechanism of a further embodiment of the present invention.
Figure 14B:
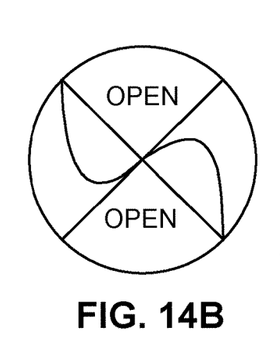
Figure 14C:
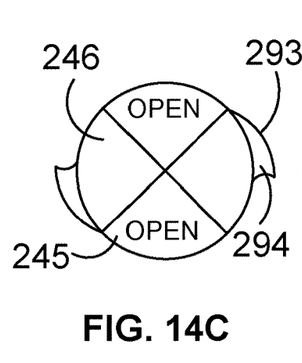
Figure 14D:
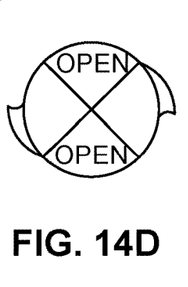
Figure 14E:
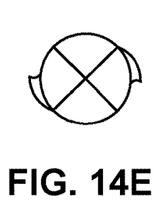
Figure 14F:
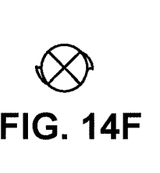

As with the previous embodiment, a blade or flute is provided on at least one of the closed segments of the door. In the illustrated embodiment a blade or flute 247 is provided on each of the closed segments 246 of the door 240. The blade or flute of this embodiment may be formed separately and attached or may be integrally formed with the door from a composite material. Suitable materials include glass or carbon fibre reinforced plastics.

In this embodiment, the front surface 293 of the flute is gently curved outwardly, away from the surface of the closed segment of the door, between the straight inner edge 290 of the blade or flute and the curved outer edge 292. The back surface 294 of the blade or flute is similar to the previous embodiment and gently curves inwards towards the surface of the closed segment of the door to provide a smooth transition between the back surface 294 of the blade or flute and surface of the closed segment of the door. This is best viewed in FIGS. 14 c-f showing the opposing curvatures of the front and back surfaces 293,294 of the blade or flute.

In this embodiment the internal volume of the blade or flute may be filled with a material such as a syntactic foam to provide buoyancy to the door of the gate It will be appreciated by the skilled person that embodiments of the invention in which the turbine blades are provided on the closed segments of the door provide advantages in relation to manufacture as the blades or flutes may be simply attached to the closed segments of the door itself, or to the structure of the door itself such as the triangular segments 43 or formed integrally with the door rather than mounted around the rim of the door.

The turbine blades provide surfaces against which the hydrodynamic forces act to produce torque to turn the door.

Furthermore, as the turbine ring in these embodiments is obviated, the effective area of the door 140, 240 is increased which provides greater release and catch openings of the door. It is envisaged that this will allow larger fish to pass through the gate easily into the code end of the trawl net.

Also, it is envisaged that when the door is locked in the catch position, the fluid flow directed by the blades may assist in directing fish into the cod end of the trawl net and also when the door is locked in the release position, the fluid flow directed by the blades may assist in directing fish out of the openings in the net.

By replacing the turbine ring around the rim of the door with flutes on the closed door segments, there is less chance of any smaller fish, shrimps, nephrops or the like becoming stuck between the turbine blades.

The present invention provides a level of selectivity to the catch of a trawl net that has not previously been available to vessels operating trawl equipment. Furthermore, the gate mechanism as described above can be operated in conjunction with imaging and processing equipment to provide real time feedback to the vessel to provide real-time information of the trawling operation. This is particularly important in providing vessels with a means for releasing unwanted fish species from the trawl net before they enter the cod end of the net and so avoids unwanted fish species from being landed on the vessel. This provides a significant benefit in reducing the bycatch and discards of a vessel, which in turn leads to improved sustainability of fisheries through the mitigation of economic, biological and ecological losses.

The present invention provides a hydrodynamically powered gate mechanism for a trawl net that can be operated between open and closed positions by an operator on the vessel based on real time images from the image processing system within the extension of the trawl net. This allows the operator to maintain the gate mechanism in the "release" position in which fish species cannot pass through the gate mechanism into the cod end and are released out of the openings in the extension of the trawl net until such time as the operator is able to verify that the fish species entering the trawl net are a desirable species in terms of the available quotas for the vessel. At that time, the operator can send a control signal to the gate mechanism to release the latch to allow the gate mechanism to rotate within the extension of the trawl net to the "catch" position such that a path is opened through the gate mechanism and the openings in the side of the extension are blocked off. The species and size of fish desired are directed through the gate mechanism and into the cod end of the trawl net from where they can be landed on the vessel when the trawl net is pulled back on board.

The conical form of the barrier and overlying door of the gate mechanism is particularly advantageous as they reduce drag within the gate mechanism and within the trawl net and function to funnel fish species through the gate mechanism without harming the fish or affecting their condition before landing the fish on the vessel.

Whilst the gate mechanism is intended to be powered by fluid flow as described above, a device such as for example a motor may be mounted on the gate mechanism to provide an initial force to rotate the gate mechanism depending upon local water conditions.

Trials conducted with embodiments of the present invention both in a flume tank and also at sea have shown the invention to perform well at different velocities travelling through the water. Video and time lapse captures revealed fish species travelling along the extension and through the gate into the cod end of the net or alternatively out through the openings in the net depending upon the door being in the catch or release positions thus allowing bycatch species such as rays to exit the net safely under control of the operator.

What is claimed is:

1. A gate mechanism adapted for mounting within the extension of a trawl net, for selectively preventing animals or marine life including fish or other species from entering the cod end of the trawl net based upon selected criteria such as species or size, the gate mechanism comprising
   a housing and
   a barrier mounted within the housing,
   the barrier having open and closed sections,
   a rotatable door mounted within the housing,
   the door having open and closed sections which selectively overlie the open and closed sections of the barrier, and
   a turbine for facilitating rotation of the door as the gate mechanism is dragged through the water within the trawl net.

2. A gate mechanism according to claim 1, wherein the barrier is substantially conical in form and the door is similarly conical in form.

3. A gate mechanism according to claim 1, wherein the gate mechanism further comprises a latch for arresting rotation of the door in selected positions to selectively provide a passageway through the gate mechanism into the cod end of the trawl net.

4. A gate mechanism according to claim 3, wherein in a first selected position the door is locked when the open sections of the door overlie the open sections of the barrier; and
   wherein in a second selected position, the door is locked when the closed sections of the door overlie the open sections of the barrier and the open sections of the door overlie the closed sections of the barrier.

5. A gate mechanism according to claim 1, wherein the housing of the gate mechanism comprises a cylindrical frame.

6. A gate mechanism according to claim 1, wherein at least one of the door and the barrier comprises a plurality of triangular segments.

7. A gate mechanism according to claim 6, wherein the number of segments in the barrier equals the number of segments of the door, and wherein the size of the segments of the barrier is substantially the same as the size of the segments of the door.

8. A gate mechanism according to claim 7, wherein a pair of opposed triangular segments of at least one of the barrier and the door have a closed configuration and a pair of opposed triangular segments of the door have an open configuration.

9. A gate mechanism according to claim 8, wherein a mesh or net or a honeycomb material covers the triangular segments of the barrier and the door with a closed configuration.

10. A gate mechanism according to claim 8, wherein the triangular segments of the barrier and the door with a closed configuration are formed of solid panels of material.

11. A gate mechanism according to claim 1, wherein the door further comprises a substantially annular rim, and wherein the turbine comprises a plurality of blades provided around the rim of the door.

12. A gate mechanism according to claim 8, wherein the turbine comprises one or more flutes or blades provided on at least one of the closed segments of the door.

13. A gate mechanism according to claim 12, wherein each blade or flute has an internal volume filled with a buoyant material.

14. A gate mechanism according to claim 11, wherein the door further comprises a plurality of arcuate panels extending from the rim and surrounding the triangular segments of the door, and wherein the arcuate panels extend around the open segments of the door.

15. A gate mechanism according to claim 1. wherein the housing of the gate mechanism comprises a substantially cylindrical structure with open circular ends held apart by a plurality of elongate rods or bars, and wherein the door is rotatably mounted within the housing on bearings.

16. A system for controlling selection of fish species caught during trawling operations comprising a trawl net including a gate mechanism according to claim 1 mounted within the extension of the trawl net.

17. A system according to claim 16 wherein the system further comprises one or more openings in the extension of the trawl net which selectively overlie or correspond to the position of the arcuate panels of the gate mechanism when it is mounted in the extension.

18. A system according to claim 16, wherein the system further comprises a detection device mounted on or within the trawl net in advance of the gate mechanism for capturing data on fish size and/or species passing through the gate mechanism, and wherein said detection device comprises a stereo camera.

19. A system according to claim 18, wherein the system further comprises a processor connected to the detection device and the gate for processing signals received from the detection device and controlling operation of the gate in response to said received signals to move the gate between a release position in which fish entering the gate mechanism are released from the opening in the extension and a catch position in which the opening in the extension is covered by the gate mechanism and fish are directed through the gate mechanism into the cod end of the trawl net.

20. A system according to claim 18, wherein image-displaying equipment is be mounted on a vessel to view images, or data, captured and processed by the detection device.

\* \* \* \* \*